United States Patent
Sundaresan et al.

(10) Patent No.: US 11,636,528 B2
(45) Date of Patent: Apr. 25, 2023

(54) METHODS AND APPARATUSES FOR RECOMMENDING SEASONAL ITEMS

(71) Applicant: Walmart Apollo, LLC, Bentonville, AR (US)

(72) Inventors: Anirudha Sundaresan, Sunnyvale, CA (US); Sneha Gupta, Mountain View, CA (US); Stephen Dean Guo, Saratoga, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 71 days.

(21) Appl. No.: 17/162,708

(22) Filed: Jan. 29, 2021

(65) Prior Publication Data

US 2022/0245702 A1 Aug. 4, 2022

(51) Int. Cl.
*G06Q 30/02* (2023.01)
*G06Q 30/0601* (2023.01)
*G06Q 30/0204* (2023.01)
*G06Q 30/0201* (2023.01)
*G06N 7/01* (2023.01)

(52) U.S. Cl.
CPC ........... *G06Q 30/0631* (2013.01); *G06N 7/01* (2023.01); *G06Q 30/0201* (2013.01); *G06Q 30/0204* (2013.01)

(58) Field of Classification Search
CPC ........... G06Q 30/0631; G06Q 30/0201; G06Q 30/0204
See application file for complete search history.

(56) References Cited

U.S. PATENT DOCUMENTS

| 2012/0036037 A1* | 2/2012 | Xiao ............... G06Q 30/00 705/26.7 |
| 2015/0032536 A1 | 1/2015 | Thomas et al. |
| 2015/0317714 A1* | 11/2015 | Huet ............... G06F 16/334 705/26.62 |
| 2019/0180301 A1 | 6/2019 | Mahalanobish et al. |

(Continued)

OTHER PUBLICATIONS

"Seasonal Relevance in E-Commerce Search" (Yang, Haode et al., Presented Nov. 1-5, 2021 at CIKM Applied Research event) (Year: 2021).*

(Continued)

*Primary Examiner* — James M Detweiler
(74) *Attorney, Agent, or Firm* — Morgan, Lewis & Bockius LLP; Manita Rawat

(57) ABSTRACT

A seasonal recommender system includes a computing device configured to obtain periodic sales data characterizing a number of purchases made of each item of a plurality of items in a specified period and to obtain periodic buyers data characterizing a number of unique customers of each item in the plurality of items in the specified period. The computing device is further configured to determine a final item seasonality embedding for each item based on the periodic sales data and the periodic buyers data and to determine a final user seasonality embedding for each user based on the periodic purchase data. The computing device is further configured to determine a final user-item score for each item based on the final item seasonality embedding and the final user seasonality embedding and to send a recommendation to a user based on the final user-item score.

5 Claims, 9 Drawing Sheets

(56) References Cited

U.S. PATENT DOCUMENTS

2019/0251446 A1* 8/2019 Fang ................. G06N 3/084
2021/0350391 A1* 11/2021 Tsai ................. G06N 20/00

OTHER PUBLICATIONS

Wijaya et al., "Hybrid Recommender System with Seasonality", 2021, p. 1-8.
Zhu et al., "Addressing the Item Cold-start Problem by Attribute-driven Active Learning", 2018, p. 1-14.
Amazon Web Services, "Time Series Forecasting Principles with Amazon Forecast", 2020, p. 1-32.
Saveski et al., "Item Cold-Start Recommendations: Learning Local Collective Embeddings", 2014, p. 1-8.

* cited by examiner

METHODS AND APPARATUSES FOR RECOMMENDING SEASONAL ITEMS

TECHNICAL FIELD

The disclosure relates generally to methods and apparatuses for recommending seasonal items. More particularly, the disclosure relates to methods and apparatuses for recommending seasonal items in ecommerce marketplaces.

BACKGROUND

At least some ecommerce marketplaces can include recommender systems that can provide recommendations to users that may be shopping, browsing or otherwise interacting with the marketplace. Recommender systems can use historical data from users to recommend items for purchase. Recommender systems can use models, algorithms or other methods to recommend items to users. The models, algorithms or other methods can use traditional open source packages or traditional algorithms to recommend such items to users.

Existing recommender systems have several drawbacks. One such drawback is that the recommender systems can be poorly suited for recommending seasonal items to users. Retailers or other ecommerce marketplace operators, however, may desire to promote, recommend or otherwise encourage users to purchase seasonal items that may have limited desirability for users for any number of reasons such as time of year, season, proximity to an event or the like. In addition, existing recommender systems can also perform poorly in the context of newly available or "cold start" items. When new items become available on an ecommerce marketplace, the limited available information for such items can cause cold start items to be rarely recommended. Retailers, however, may desire to promote or encourage the purchase of cold start items. There exists a need, therefore, for improved recommender systems that can be used to advantageously promote and/or recommend seasonal items and cold start items.

SUMMARY

The embodiments described herein are directed to methods and apparatuses for recommending seasonal items to users of an ecommerce marketplace. The embodiments described herein can be implemented using one or more computing devices that can include operative elements that can obtain various types of data such as periodic sales data, periodic buyers data and periodic purchases data. Seasonal trends and patterns can be extracted from the data using a seasonality engine to determine peaks in the data that can indicate seasonality. Such seasonal trends and patterns can be extracted at both the item level and the category level and can be stored as item seasonal embeddings, category seasonality embeddings. The seasonality engine can also extract seasonal trends and patterns at the user level and store such information as user seasonality embeddings. The item and category seasonality embeddings can be blended and stored as final item seasonality embeddings. A seasonality model can be used in which the user seasonality embeddings, the final item seasonality embeddings as well as non-seasonal item embeddings and non-seasonal user embeddings can be input into a machine learning model to determine final user-item scores that can indicate a seasonality of each item in a catalog of items that are available on the ecommerce marketplace. The final user-item scores can be used by the seasonal recommender system to send recommendations for seasonal items to the user.

In accordance with various embodiments, exemplary systems may be implemented in any suitable hardware or hardware and software, such as in any suitable computing device. For example, in some embodiments, a seasonal recommender system can include a computing device configured to obtain periodic sales data characterizing a number of purchases made of each item of a plurality of items in a specified period and to obtain periodic buyers data characterizing a number of unique customers of each item in the plurality of items in the specified period. The computing device can be configured to obtain periodic purchase data characterizing a count of purchases by each user in the specified period. The computing device can be further configured to determine a final item seasonality embedding for each item in the plurality of items based on the periodic sales data and the periodic buyers data and to determine a final user seasonality embedding for each user based on the periodic purchase data. The computing device can be further configured to determine a final user-item score for each item in the plurality of items based on the final item seasonality embedding and the final user seasonality embedding and to send a recommendation to a user based on the final user-item score.

In one aspect, the final item seasonality embedding can be determined by blending an item seasonality embedding with a category seasonality embedding.

In another aspect, the item seasonality embedding is blended with the category seasonality embedding using a blending function that weighs the category seasonality embedding based on the number of items in a category.

In another aspect, the final user-item score is determined using a trained machine learning model.

In another aspect, the final item seasonality embedding and the final user seasonality embedding are inputs to a Bayesian Personalized Ranking model to determine the final user-item score.

In another aspect, the final user-item score is determined based on the final item seasonality embedding, the final user seasonality embedding, a non-seasonal item embedding and a non-seasonal user embedding.

In another aspect, the final user-item score for each item is determined by calculating a dot product of corresponding item and user vectors from a derived item matrix and a derived user matrix, respectively.

In other embodiments of the present disclosure a method for recommending seasonal items to a user of an ecommerce marketplace is provided. In one embodiment, a method can include obtaining periodic sales data characterizing a number of purchases made of each item of a plurality of items in a specified period and obtaining periodic buyers data characterizing a number of unique customers of each item in the plurality of items in the specified period. The method can also include obtaining periodic purchase data characterizing a count of purchases by each user in the specified period. The method can also include determining a final item seasonality embedding for each item in the plurality of items based on the periodic sales data and the periodic buyers data and determining a final user seasonality embedding for each user based on the periodic purchase data. The method can also include determining a final user-item score for each item in the plurality of items based on the final item seasonality embedding and the final user seasonality embedding and sending a recommendation to a user based on the final user-item score.

In other embodiments in accordance with the present disclosure, a non-transitory computer readable medium is provided. In some embodiments, the non-transitory computer readable medium can have instructions stored thereon, wherein the instructions, when executed by at least one processor, can cause a device to perform operations that include obtaining periodic sales data characterizing a number of purchases made of each item of a plurality of items in a specified period and obtaining periodic buyers data characterizing a number of unique customers of each item in the plurality of items in the specified period. The operations can also include obtaining periodic purchase data characterizing a count of purchases by each user in the specified period. The operations can also include determining a final item seasonality embedding for each item in the plurality of items based on the periodic sales data and the periodic buyers data and determining a final user seasonality embedding for each user based on the periodic purchase data. The operations can also include determining a final user-item score for each item in the plurality of items based on the final item seasonality embedding and the final user seasonality embedding and sending a recommendation to a user based on the final user-item score.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
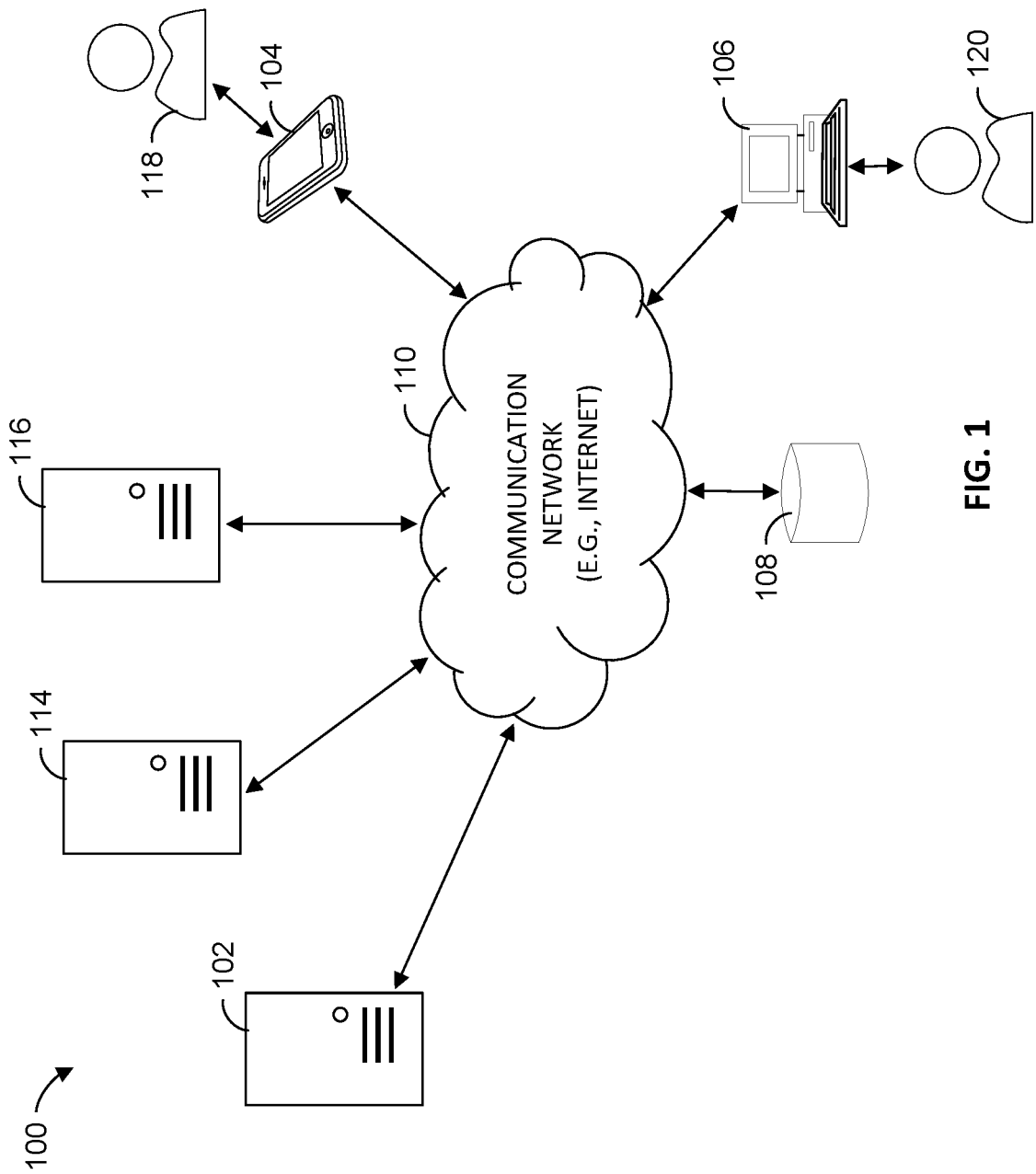
FIG. 1 is a block diagram of a seasonal recommender system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

In some ecommerce marketplaces, the marketplace can include a recommender system that can operate to provide recommendations to the users that are using the marketplace. The recommender systems can, for example, provide recommendations to the users such as recommended substitute items, recommended items for purchase or other recommendations. These recommendations can be presented or displayed to the users by showing such recommended items on the ecommerce marketplace website. Retailers or other operators of ecommerce marketplaces often want to promote and/or recommend seasonal items on the ecommerce marketplaces. Traditional recommender systems can be poorly suited to recommend seasonal items on the ecommerce marketplaces because such seasonal items often have less transactional data than non-seasonal items. In such instances, the recommender systems often recommend non-seasonal items because the items appear to be more popular than seasonal items because of the increased transactions (e.g., views, clicks, purchases) for the non-seasonal items.

Because of this and other short-comings of existing recommender systems, retailers or other ecommerce operators use seasonal recommender systems that can include the manual or semi-manual input of recommended seasonal items to include as recommendations on ecommerce marketplaces. In such existing seasonal recommender systems, analysts or other knowledgeable individuals can view sales patterns and identify seasonal trends. After manually identifying seasonal trends and patterns, the analysts can provide ad-hoc instructions to the existing recommender systems to include desired seasonal items as recommendations during the identified seasonal patterns.

These existing seasonal recommender systems are time consuming, costly and can fail to identify unknown seasonal trends. In addition, these existing seasonal recommender systems can include less personalization than automatic recommender systems. These drawbacks can lead to increased cost, lost sales and decreased customer satisfaction.

The methods and apparatuses of the present disclosure include automatic personalized seasonal recommendation systems that can automatically provide personalized recommendations to users for seasonal items. The methods and apparatuses of the present disclosure can identify seasonal patterns by blending item and category seasonality information together to provide a seasonality score. This blended seasonality score can identify seasonal items to provide as recommendations that may otherwise remain unidentified using existing recommender systems.

The blended seasonality score can also be used to boost cold start items. Cold start items (i.e., new products added to the ecommerce marketplace) can suffer from similar problems to seasonal items in that cold start items can lack significant amounts of historical transactional data. This lack of information regarding the cold start item can lead to the cold start item not being recommended by existing recommender systems. The seasonal recommender systems of the present disclosure can be used to boost cold start items (i.e., include the cold start items as recommended items in the ecommerce marketplace).

The methods and apparatuses of the present disclosure also can improve the personalized ranking problem of existing recommender systems. The methods and apparatuses of the present disclosure can use both a seasonality score (or signal) in addition to user preference information to provide personalized seasonal recommendations. This, in turn, also improves the discovery of relevant items by using both the seasonality scores and user preference information.

The seasonality scores of the seasonal recommender systems of the present disclosure can include a seasonality engine to identify top seasons for items and for categories of items. Since the seasonal recommender systems is fully automatic, it may identify seasons that existing seasonal recommender systems and methods may not otherwise identify. The seasonal recommender systems of the present disclosure have numerous applications for a retailer or other operator of an ecommerce marketplace. The seasonal recommender systems and the identified seasonality scores can be used to create effective seasonal promotional campaigns. In addition, the seasonal recommender systems of the present disclosure can be used to recommend items to users, to signal a user to stock-up before checkout, to provide recommended substitute items for out-of-stock items in addition to the applications described herein. The seasonality scores of the seasonal recommender systems of the present disclosure can be determined and stored for use across a retailer's organization.

Turning to the drawings, FIG. 1 illustrates a block diagram of an example seasonal recommender system 100 that includes a seasonality computing device 102 (e.g., a server, such as an application server), a central ordering computing device 114, a customization computing device 116 (e.g., a web server), a database 108, and multiple user computing devices 104, 106 operatively coupled over network 110. Seasonality computing device 102, central ordering computing device 114, customization computing device 116, and multiple user computing devices 104, 106 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 110.

In some examples, seasonality computing device 102 can be a computer, a workstation, a laptop, a server such as a cloud-based server, or any other suitable device. In some examples, each of the multiple user computing devices 104, 106 can be a cellular phone, a smart phone, a tablet, a personal assistant device, a voice assistant device, a digital assistant, a laptop, a computer, or any other suitable device. In some examples, seasonality computing device 102 and the central ordering computing device 114 can be operated and/or controlled by a retailer, and multiple user computing devices 104, 106 are operated by users or customers.

The central ordering computing device 114 can be distributed among one or more workstations or servers that are coupled together over the network 110. The central ordering computing device 114 can cause an ecommerce marketplace to be displayed or otherwise communicated via one or more websites. The users 118, 120 can view, browse and order items that may be made available via the ecommerce marketplace. The central ordering computing device 114 can collect information for such orders including item information, payment information, delivery information and the like. The central ordering computing device 114 can store such information and/or send such information for storage in the database 108 or in other components of the seasonal recommender system 100.

The customization computing device 116 can also be distributed among one or more workstations or servers that are coupled together over the network 110. In other examples, the customization computing device 116 can be a single computing device as shown. The customization computing device 116 can include various personalization engines that can deliver customized or personalized content, information or other data to the central ordering computing device 114 and/or to other elements of the system. The customization computing device 116 can be a recommender system, for example, that can deliver recommendations to the user computing devices 104, 106. In other examples, the customization computing device 116 can be a substitution system or other personalization system of the retailer. As will be further described, the seasonality computing device 102 can determine item seasonality embeddings and user seasonality embeddings that can be used to determine a user-item score. This user-item score can be used to provide seasonal recommendations.

Seasonality computing device 102 can also be operable to communicate with database 108 over the communication network 110. The database 108 can be a remote storage device, such as a cloud-based server, a memory device on another application server, a networked computer, or any other suitable remote storage. Although shown remote to seasonality computing device 102, in some examples, database 108 can be a local storage device, such as a hard drive, a non-volatile memory, or a USB stick.

Communication network 110 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 110 can provide access to, for example, the Internet.

The user computing devices 104, 106 may communicate with the central ordering computing device 114 over communication network 110. For example, the central ordering computing device 114 may host one or more ecommerce marketplaces on one or more websites. Each of the user computing devices 104, 106 may be operable to view, access and interact with the websites hosted by the central ordering computing device 114. In some examples, the central ordering computing device 114 can allow a user 118, 120, via the user computing devices 104, 106, to browse, search and/or select products for purchase. As will be further explained, the central ordering computing device 114 can also personalize the websites through the display of seasonal recommendations or through other personalized content via the user computing device 104, 106.

Figure 2:
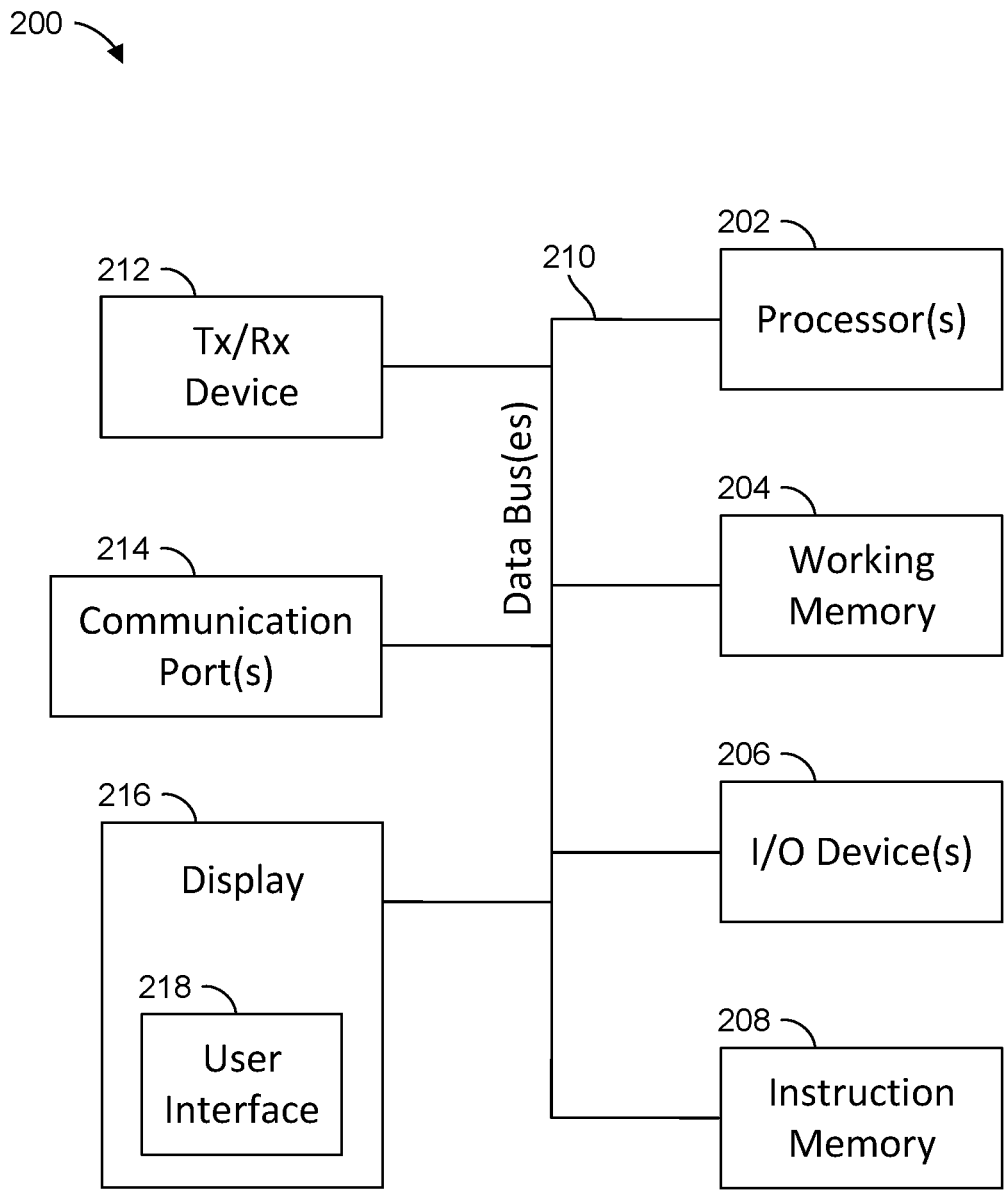
FIG. 2 is a block diagram of a computing device of the system of FIG. 1 in accordance with some embodiments.

FIG. 2 illustrates an example computing device 200. The seasonality computing device 102, the central ordering computing device 114, the customization computing device 116, and/or the user computing devices 104, 106 may include the features shown in FIG. 2. For the sake of brevity, FIG. 2 is described relative to the seasonality computing device 102. It should be appreciated, however, that the elements described can be included, as applicable, in the central ordering computing device 114, the customization computing device 116, and/or the user computing devices 104, 106.

As shown, the seasonality computing device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the seasonality computing device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as periodic sales data, periodic buyers data, periodic purchase data and the like.

Display 216 can display a user interface 218. User interfaces 218 can enable user interaction with the seasonality computing device 102. For example, user interface 218 can be a user interface that allows an operator to interact, communicate, control and/or modify different features or parameters of the seasonality computing device 102. The user interface 218 can, for example, display the performance of the seasonality computing device 102 and/or seasonal sales/transaction distributions using different textual, graphical or other types of graphs, tables or the like. In some examples, a user can interact with user interface 218 by engaging input-output devices 206. In some examples, display 216 can be a touchscreen, where user interface 218 is displayed on the touchscreen.

Transceiver 212 allows for communication with a network, such as the communication network 110 of FIG. 1. For example, if communication network 110 of FIG. 1 is a cellular network, transceiver 212 is configured to allow communications with the cellular network. In some examples, transceiver 212 is selected based on the type of communication network 110 seasonality computing device 102 will be operating in. Processor(s) 202 is operable to receive data from, or send data to, a network, such as communication network 110 of FIG. 1, via transceiver 212.

Figure 3:
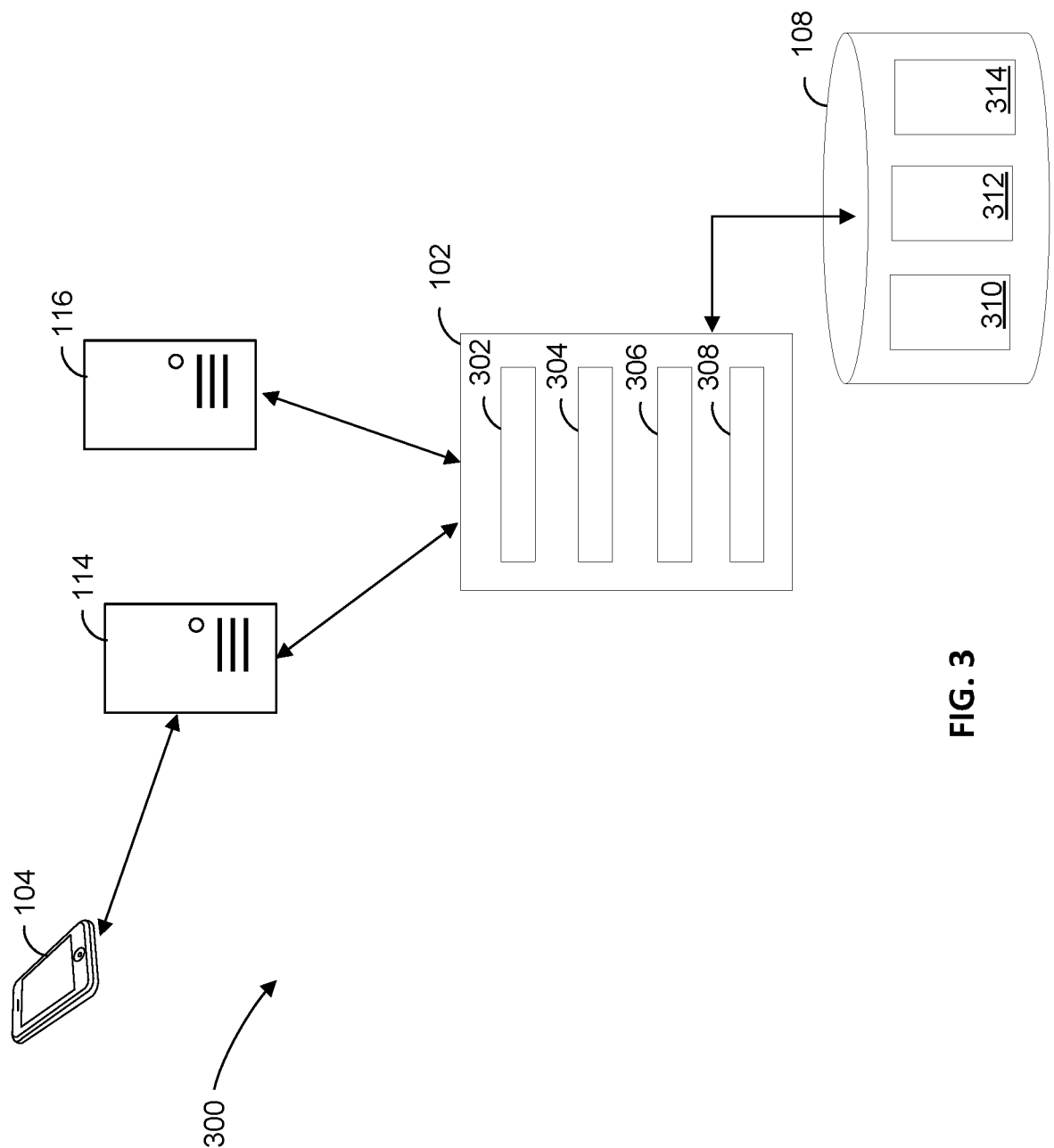
FIG. 3 is a block diagram illustrating examples of various portions of the seasonal recommender system of FIG. 1.

Turning now to FIG. 3, an example seasonal recommender system 300 is shown. The seasonal recommender system 300, in this example, includes seasonality computing device 102, central ordering computing device 114, customization computing device 116, and database 108. The seasonality computing device 102 can be coupled to the central ordering computing device 114, the customization computing device 116 and the database 108 using any suitable wired or wireless connection such as by network 110 previously described. The user computing device 104 can also be coupled to the central ordering computing device 114 and/or to the seasonality computing device 102.

The seasonality computing device 102 can operate to determine seasonal trends or patterns in addition to determining a user-item score that can be used to rank and/or identify seasonal items to be recommended to a user during a particular period. The terms "season" and/or "period" are used in the present disclosure to describe a particular period of time. It should be appreciated that a "season" and/or "period" is not limited to a season as that term is often traditionally used. A season or period for the purposes of the present disclosure can include any identified period of time that can include periods proximate to a holiday or other event. Such periods can include periods of time that may be proximate to Christmas, Easter, Passover, Kwanza, the Fourth of July, Thanksgiving, the Superbowl, Valentine's Day, Memorial Day or the like. Periods or seasons can also include user behavior that follows a pattern during particular times of year such as prior to the start of the school year, during school breaks, hurricane season, vacation season, and the like. Still further, seasons or periods can be further identified within a given month or within a given week. User patterns can be identified, for example, to correspond to monthly or bi-weekly pay days or to user patterns in a given week such as a weekly trip to the grocery store. The terms season and period (and variants of such terms as understood by the context) should be understood to include any of the above described or other periods of time in which a user transaction pattern or trend on the ecommerce marketplace can be identified.

The seasonality computing device 102 can, in this example, include a data extraction engine 302, a seasonality engine 304, a scoring engine 306 and a seasonality model 308. The data extraction engine 302 can be any suitable application or other interface that can use suitable protocols to obtain data from other computing devices such as from the central ordering computing device 114, database 108 and/or from the customization computing device 116. The data extraction engine 302 can, for example, include suitable application protocol interfaces (APIs) that can enable the data extraction engine 302 to obtain sales data 310, buyers data 312 and/or purchase data 314 from the central ordering computing device 114 or from database 108 that can describe the interactions of users on the ecommerce marketplace.

The sales data 310, the buyers data 312 and the purchase data 314 can be data collected from transactions by users on the ecommerce marketplace. The sales data 310, the buyers data 312 and the purchase data 314 can include information regarding items that are available on the ecommerce marketplace. Items are individual items that can be purchased. The items can be organized using any taxonomy system or data on the ecommerce marketplace. The items, for example, can be organized into categories of different levels. For example, the items can be organized into a level 1 category that is the highest level for the retailer. The level 1 category can include, for example, grocery goods, home goods, pharmacy goods, office goods, clothing goods and the like. Within each of these level 1 categories, the items can be further organized into level 2 categories. For example, within the level 1 category of grocery goods, the items can be further organized into level 2 categories such as produce, dairy, frozen goods, dry goods, beverages, and the like. The items can be further categorized into level 3 categories and so on. The sales data 310, the buyers data 312 and the purchase data 314 can include this taxonomy information as described.

The sales data 310, the buyers data 312 and the purchase data 314 can also be periodic data. For example, the sales data 310, the buyers data 312 and the purchase data 314 can be obtained or separated into data for specific periods of time. In some examples the sales data 310, the buyers data 312 and the purchase data 314 can be obtained for each day, each week, each month or for other periods or seasons. In one example, the sales data 310 can be a count of purchases for a particular item. The sales data 310 can also be periodic sales data such as a daily count of purchases for a particular item. The buyers data 312 can be a count of unique customers for a particular item. The buyers data 312 can be periodic buyers data such as a daily count of unique customers for a particular item. The purchase data 314 can be a count of purchases for each user. The purchase data 314 can be periodic purchase data such as a daily count of purchases for each user. In other examples, the periodic data can be obtained for other seasons or periods.

The seasonality engine 304 can be any suitable application, algorithm, machine learning model or the like that can identify seasonal patterns and trends in user activity on the ecommerce marketplace. The seasonality engine 304 can, for example, include time series decomposition tools and/or algorithms that can decompose the sales data 310, the buyers data 312 and the purchase data 314 into trends, seasonality and noise. After employing suitable time series decomposition Open source tools, libraries or other packages, the data can be de-trended to determine patterns and/or seasonality in the data. In other examples, other methods can be used by the seasonality engine 304 such as signal processing methods (e.g., fast fourier transform, auto-correlation, outlier detection), entropy-based calculations, or other Seasonal and Trend decomposition using Loess (STL) time series packages.

The scoring engine 306 can operate to determine a seasonality score that can be a score that combines the seasonal patterns and trends that are identified by the seasonality engine 304 of identified item seasonality and category seasonality. By combining the seasonal or periodic trends for both the item level and the category level, the scoring engine 306 can determine a blended final item seasonality score that can better identify seasonal and/or period trends in purchasing behavior. The scoring engine 306 can use any suitable application, algorithm, machine learning model or the like to combine the item level seasonality and the category level seasonality to determine a seasonality score. In one example, a seasonality score function or blend function can be used to weigh the item seasonality and the category seasonality. The seasonality score function, for example, can add the item level seasonality to the category level seasonality and weigh the category level seasonality based on the size of the category. The category seasonality can be weighed in such a manner (as will be further described below) to boost cold start items. In other examples, other seasonality score functions can be used.

The seasonality model 308 can operate to use the seasonality score(s) that are determined by the scoring engine 306 in combination with user seasonality to produce a user-item score. The seasonality-based user-item score is an improvement over existing recommender systems because the user-item score can more accurately rank items to be recommended to the user based on the seasonality scores for items, categories and the user. This can provide accurate recommendations to the user for seasonal items. The seasonality model 308 can use any suitable application, algorithm, machine learning model or the like to determine the user-item scores. In one example, the seasonality model 308 can include a machine learning model that can use Bayesian Personalized Ranking. In other examples, other ranking or recommender tools, packages, applications, methodologies and machine learning libraries can be used.

The seasonality computing device 102 can also be coupled to the database 108. The seasonality computing device 102 can access various types and quantities of data from the database 108. The database 108 can include the sales data 310, the buyers data 312 and the purchase data 314. The seasonality computing device 102 can also store the user-item scores in the database 108. In some examples, the customization computing device 116 (or other elements of the seasonal recommender system 300) can obtain the stored user-item scores from the database 108.

Referring now to FIGS. 4-7, a schematic of an example architecture of a seasonal recommender system 400 is shown. The seasonal recommender system 400 can include a data extraction engine 402, a seasonality engine 404, a scoring engine 406 and a seasonality model 408. The seasonal recommender system 400 is operative to obtain data from the data source 410, that can be any suitable data storage device such as database 108. As will be further described, data is obtained and filtered by the data extraction engine 402. The data can then be provided to the seasonality engine 404 that can perform seasonality extraction and normalization of the data. The data can then be provided to the scoring engine 406 that can aggregate the seasonality data and blend item seasonality data and category data into final item seasonality embeddings 460. The final item seasonality embeddings 460 together with final user seasonality embeddings 458 can be provided to the seasonality model 408 that can help determine final user-item scores 464. The final user-item scores 464 can then be used to provide recommendations for seasonal items to a user of the ecommerce marketplace.

As shown in one example, the data extraction engine 402 can obtain the data from the data source 410. The data source 410 can be any suitable data storage device that collects information regarding user transactions on the ecommerce marketplace, such as database 108. For example, the data source 410 can include a catalog of items that are offered for sale on the ecommerce marketplace and related taxonomy data that can categorize the items in the catalog into multiple groups of related items. The data in the data source can also include user item interaction data 452 that can include information about transactions, purchases and other actions performed by users on the ecommerce marketplace. The data store can also include an embedding store 450. The embedding store 450 can include vectors or other previously created embeddings that can be, for example, previously prepared by the data extraction engine 402 or by similar extraction engines that may be operating for other recommender systems.

The data that is obtained by the data extraction engine 402 can include item-level data 414 and user level data 412. In the example shown, the data extraction engine 402 can obtain periodic sales data such as daily sales data (Signal 1) that can characterize a number of purchases made for each item in the catalog of items for a selected period. In this example, the period is one day so that the periodic sales data is daily sales data. In other examples, other periods can be used.

The data extraction engine 402 can also obtain periodic buyers data such as daily buyers data (Signal 2). The periodic buyers data can characterize a number of unique customers of each item in the catalog of items for a selected period. In this example, the period, again, is one day so that the periodic buyers data is daily buyers data. In other examples, other periods can be used.

The data extraction engine 402 can also obtain periodic purchase data (Signal 3). The periodic purchase data can characterize a count of purchases of each user in the selected period. In this example, the period, again, is one day so that the periodic purchase data is daily purchase data. In other examples, other periods can be used.

The data extraction engine 402 can also include one or more filters that can filter the data. In this example, the data extraction engine 402 can include a first category filter 416, a second category filter 422, a first item filter 418 and a second item filter 420. The category filters 416, 422 can aggregate the item data at the category level. For example, the category filters 416, 422 can use the item level data for the daily sales data and the daily buyers data to obtain daily sales data for each category and daily buyers data for each category in the taxonomy of the items in the catalog. The category filters 416, 422 can also filter the daily sales data and the daily buyers data to retain data only for a predetermined look-back period. Any look-back period can be used. In this example, the look-back period is two years. Thus, the category filters 416, 422 retain only daily sales data and daily buyers data for most recent two years. In this manner, the most recent seasonal patterns and trends can be determined.

The item filters 418, 420 can also filter the daily sales data and the daily buyers data to retain data only for the predetermined look-back period. In a similar manner to the category filters 416, 418, the item filters 418, 420 can retain daily sales data and daily buyers for the most recent two years. In other examples, other look-back periods can be used.

Figure 4:
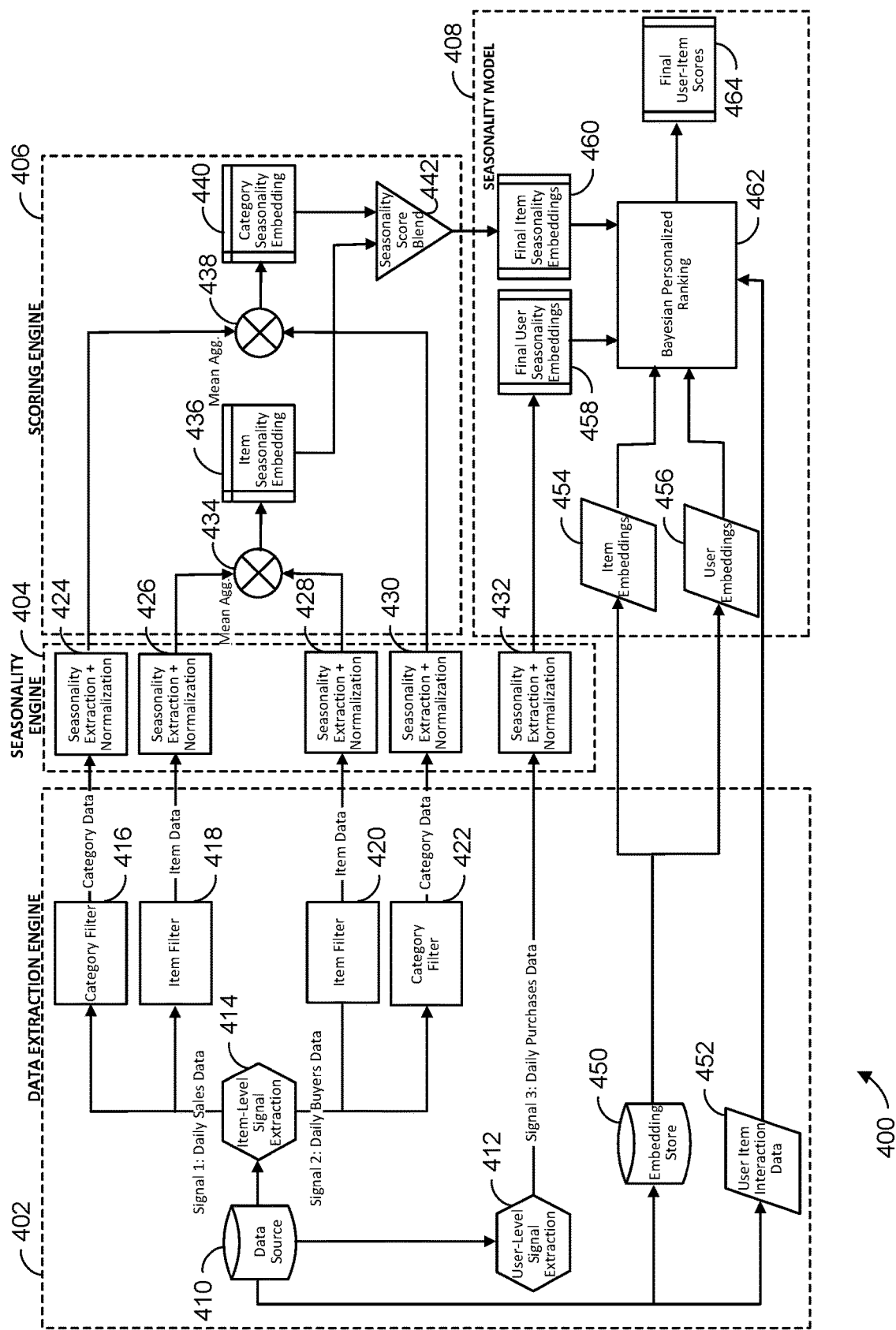
FIG. 4 is a block diagram showing an example architecture of a seasonal recommender system in accordance with the present disclosure.
Figure 5:
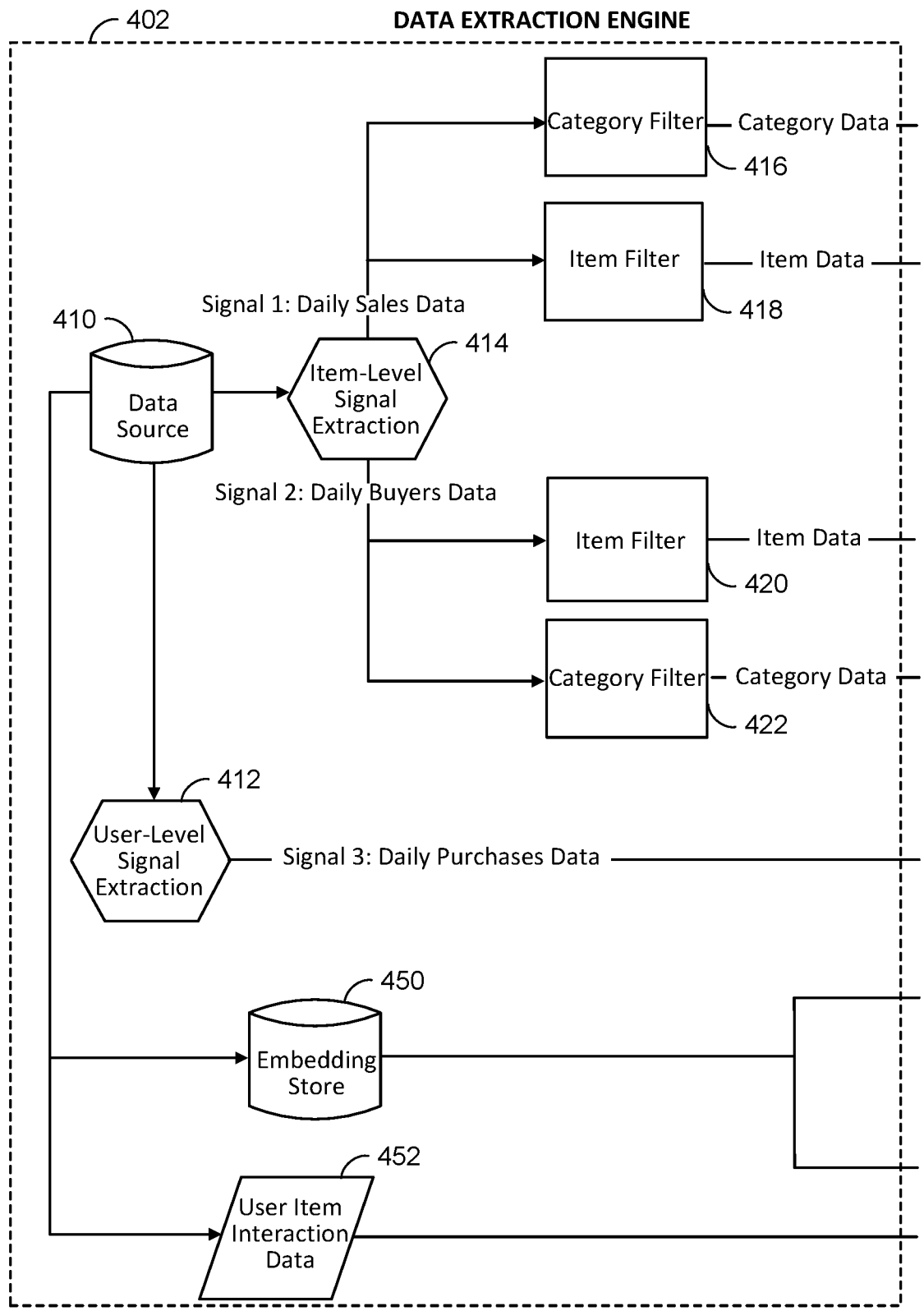
FIG. 5 is a block diagram showing aspects of a data extraction engine of the seasonal recommender system of FIG. 4.
Figure 6:
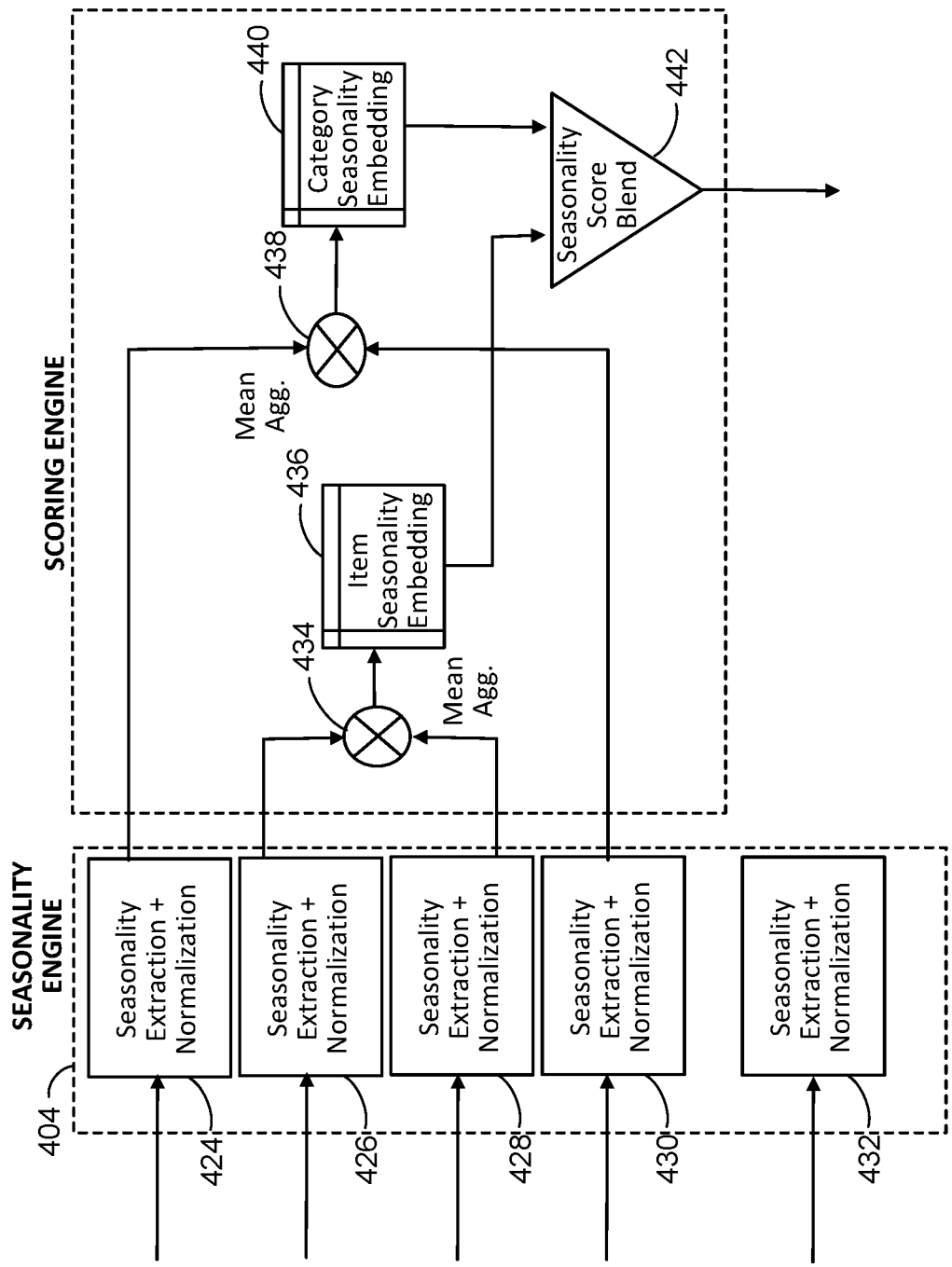
FIG. 6 is block diagram showing aspects of a seasonality engine and a scoring engine of the seasonal recommender system of FIG. 4.

The filtered category data, the filtered item data and the periodic purchases data can then be provided to the seasonality engine 404. As shown in FIGS. 4 and 6, the seasonality engine 404 can include a first seasonality extraction and normalization component 424, a second seasonality extraction and normalization component 426, a third seasonality extraction and normalization component 428, a fourth seasonality extraction and normalization component 430 and a fifth seasonality extraction and normalization component 432. Each of the seasonality extraction and normalization components can operate to extract and normalize the data that is provided to the seasonality engine 404 by the data extraction engine 402. The seasonality extraction and normalization components can, for example, decompose the category data, the item data and the purchases data into trend, seasonality and noise. The data can be de-trended to determine the seasonality trends in the data. Any suitable open source, proprietary or other libraries can be used to perform the operations in the seasonality extraction and normalization components.

In one example, standard-scaler normalization can be used to normalize the category data, the item data and/or the purchases data. Standard-scaler normalization can be used to scale the data using a common standardized scale so that the seasonality components that are extracted can be viewed, analyzed or otherwise used and compared systematically. Standard-scaler normalization, for example, allows the item data and category data to be standardized to constrain the dispersion of data as well as allowing outlier data to be handled effectively. The output of each seasonality extraction and normalization component can be vector with dimension 365×m, where m is the seasonality dimension. In one example, m can equal 3 that corresponds to a yearly, monthly and weekly seasonality.

In addition to normalizing the category data, the item data and/or the purchases data, the seasonality extraction and normalization components can operate to identify seasonality patterns and/or trends in the data. The seasonality engine 404 and/or the a first seasonality extraction and normalization component 424, the second seasonality extraction and normalization component 426, the third seasonality extraction and normalization component 428, the fourth seasonality extraction and normalization component 430 and/or the fifth seasonality extraction and normalization component 432 can include open source or proprietary algorithms, software tools or other libraries known in the art to identify seasonal trends or patterns in the data. In one example, the seasonality engine 404 and/or the seasonality extraction and normalization components can use a peak-find algorithm to detect peaks in the data. Maximum and minimum peaks and localized peaks can be identified to determine the magnitude and the length of time for such peaks in the data. Such an algorithm can identify seasonal trends and patterns in the data. When such peaks are identified, this seasonal identification data can be stored for later use.

The seasonality extraction and normalization components can also determine seasonality vectors that can characterize the seasonality identification data for the item data, the category data and the purchase data. This information can be organized and stored as a seasonality vector. The seasonality vectors from the first seasonality extraction and normalization component 424, the second seasonality extraction and normalization component 426, the third seasonality extraction and normalization component 428, the fourth seasonality extraction and normalization component 430 and the fifth seasonality extraction and normalization component 432 can be provided to the scoring engine 406. The scoring engine can combine the vectors from the seasonality extraction and normalization components to obtain item seasonality embeddings 436 and category seasonality embeddings 440. The item seasonality embeddings can be combination of the normalized seasonality scores from the periodic sales data and the periodic buyers data. In the example shown, the seasonality scores from the first seasonality extraction and normalization component 424 can be combined with the seasonality scores from the fourth seasonality extraction and normalization component 430. The seasonality scores can be combined by an aggregator 438 that can combine the seasonality scores using any suitable method or technique. In one example, the seasonality scores can be combined by averaging the normalized seasonality scores to obtain category seasonality embeddings 440. In other examples, other methods or techniques can be used to combine the normalized seasonality scores.

Similarly, the normalized seasonality scores from the second seasonality extraction and normalization component 426 can be combined with the normalized seasonality scores from the third seasonality extraction and normalization component 428. The seasonality scores can be combined by an aggregator 434 that can combine the seasonality scores using any suitable method or technique. In one example, the seasonality scores can be combined by averaging the normalized seasonality scores to obtain item seasonality embeddings 436. In other examples, other methods or techniques can be used to combine the normalized seasonality scores.

The scoring engine 406 can also operate to blend the item seasonality embeddings 436 with the category seasonality embeddings 440 to obtain final item seasonality embeddings 460. The scoring engine 406 can include a seasonality score blender 442 to blend the item seasonality embeddings 436 with the category seasonality embeddings 440. Any suitable blending method and technique can be used. In one example, the item seasonality embeddings 436 and the category seasonality embeddings 440 can be blended using a blend function. For example, the item seasonality embeddings 436 can be blended with the category seasonality embeddings to determine a final item score $i_f = f(i_S, C_S)$ for each seasonality dimension where f is a blend function and item i belongs to category c i.e. $i \in c$ and $c \in C$, where C is item catalog, $i_S$ and $c_S$ are item and category seasonality scores, and $|c|$ and $|C|$ represent items in category c and catalog C respectively. The final item scores can be calculated using equation 1 below.

$$i_f = f(i_s, c_s) = i_s + \frac{|c|}{|C|} C_s \qquad \text{Equation 1}$$

The example blend function of Equation 1 can serve to boost cold start items (e.g., items with low seasonality scores due to a lack of sales data) if such cold start item belongs to a category with a high seasonality score. The blended scores can be used to determine final item seasonality embeddings 460. The final item seasonality embeddings 460 can, in one example, each be a 365× m dimension embeddings with m, being different seasonality scores. As discussed above, m can equal 3 to provide a yearly, monthly and weekly seasonality score for each day in year. Similarly, the final user seasonality embeddings 458 can be similarly dimensioned and can be obtained directly from the fifth seasonality extraction and normalization component 432 (see FIG. 4).

Figure 7:
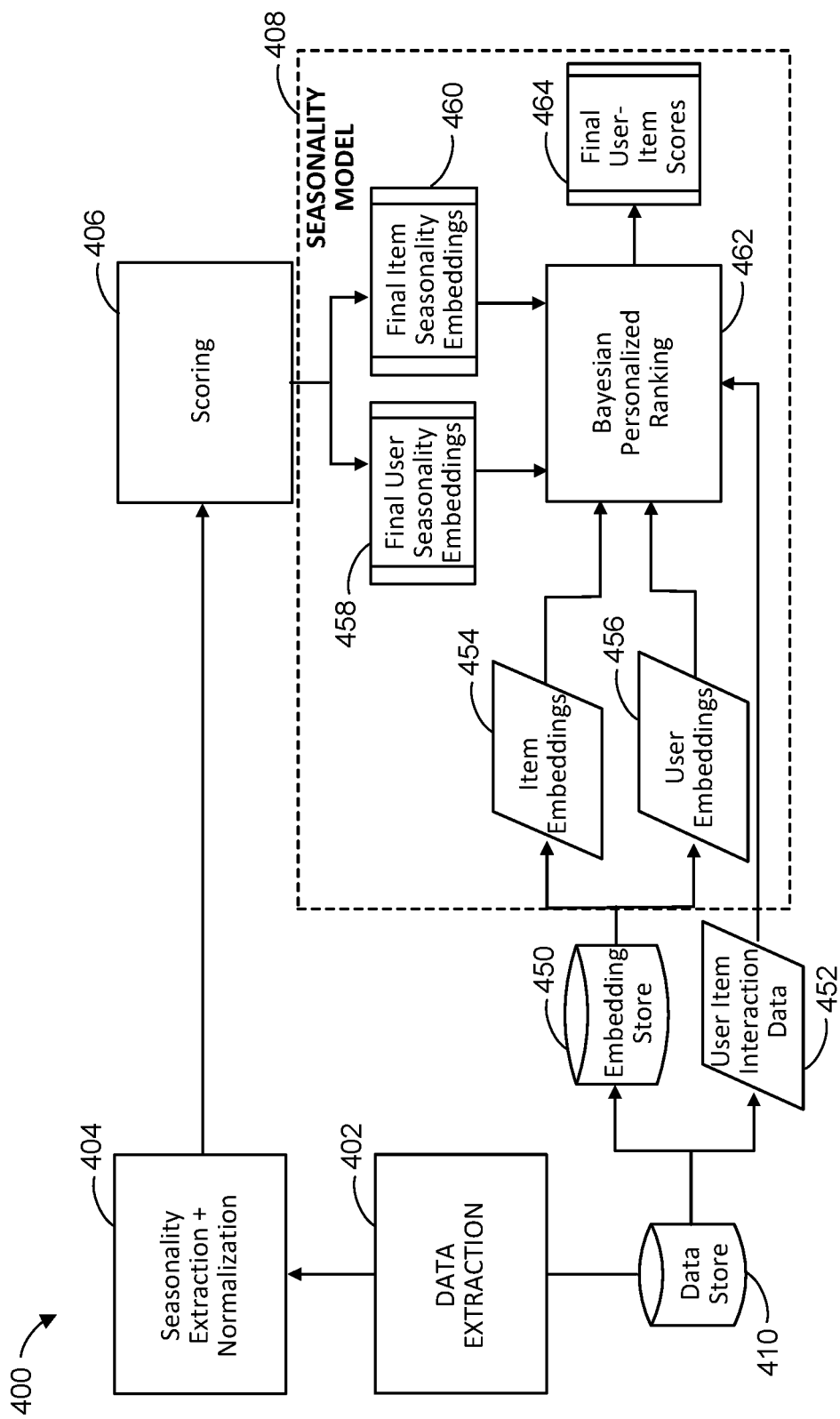
FIG. 7 is a block diagram showing aspects of a seasonality model of the seasonal recommender system of FIG. 4.

As shown in FIGS. 4 and 7, the final user seasonality embeddings 458 and the final item seasonality embeddings 460 can be used to help determine final user-item scores 464. The final user seasonality embeddings 458 and the final item seasonality embeddings can be provided to the seasonality model 408 to help determine the final user-item scores 464. In the example shown, the seasonality model 408 can include a trained machine learning model to determine the final user-item scores. The trained machine learning model 462 can, for example, use Bayesian Personalized Ranking (BPR) to determine the final user-item scores. The trained machine learning model 462 can also use non-seasonal data such as item embeddings 454 and user embeddings 456 in addition to the final user seasonality embeddings 458 and the final item seasonality embeddings 460. The item embeddings 454 and the user embeddings 456 can be obtained, for example, from an embeddings store 450. The embeddings store 450 can be a database or other storage device in which previously determined item embeddings and user embeddings can be stored. The item embeddings 454 and the user embeddings 456 can have been previously normalized, for example. The machine learning model 462 can also use user item interaction data 452 that can characterize a user's interactions on the ecommerce marketplace.

Figure 8:
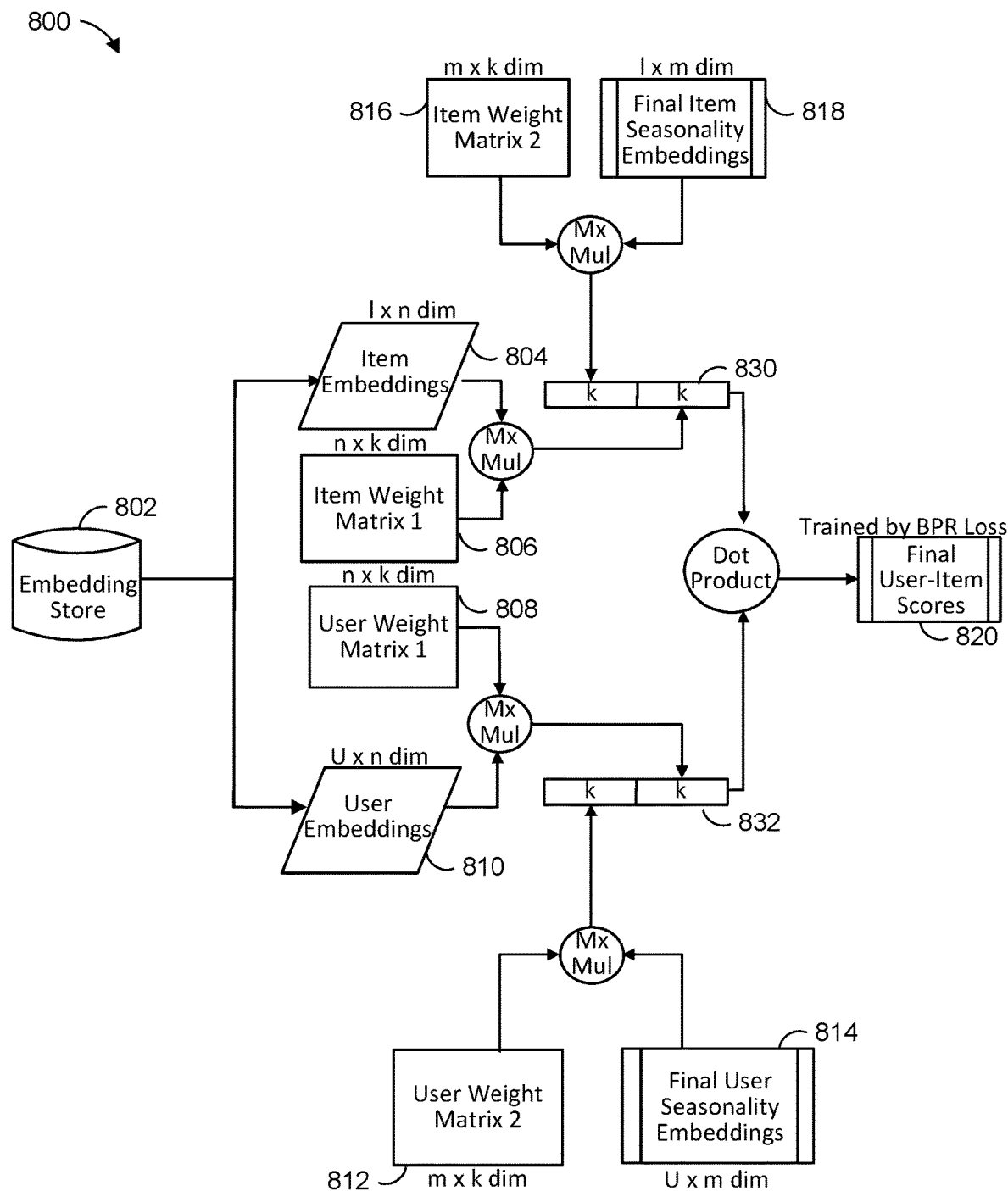
FIG. 8 is a diagram illustrating an architecture of a seasonality model of the seasonal recommender system of FIG. 4.

Referring now to FIG. 8, an example schematic of a seasonality model 800 is shown. In this example, the seasonality model 800 can use Bayesian Personalized Ranking (BPR) to determine the final user-item scores 820. Open source, proprietary modeling software, applications and libraries can be used to train and implement the seasonality model 800 using Bayesian Personalized Ranking. In general, the machine learning model using BPR can be trained using training data $D_S$, where item pairs are considered as training data: $(u, i, j) \in D_S$, where user u is assumed to prefer item i over item j. The method maximizes the posterior probability (Equation 2 below) where $\Theta$ represents the parameter vector of an arbitrary model class.

$$p(\Theta | >_u) \propto p(>_u | \Theta) p(\Theta) \qquad \text{Equation 2}$$

$>_u$ is the desired but latent preference structure for user u
$p(>_u | \Theta)$ is a user specific likelihood function
$p(\Theta) \sim N(0, \Sigma_{73})$ is prior probability (normal distribution with 0 mean and variance-covariance matrix)

Since users would act independently and the ordering of each pair of items (i, j) for a specific user is independent of the ordering of every other pair, the seasonality model 800 can determine the individual probability that a user prefers item i to item j by using Equation 3 below.

$p(i>_u j | \Theta) := \sigma(\hat{x}_{uij}(\Theta))$ and a is the logistic sigmoid $$\sigma(x) := \frac{1}{1 + e^{-x}} \qquad \text{Equation 3}$$

The seasonality model 800 can then be trained using the criterion/loss function (Equation 4) shown below.

$$\Sigma_{(u,i,j) \in D_S} \ln \sigma(\hat{x}_{uij}) - \lambda_\Theta \|\Theta\|^2 \qquad \text{Equation 4}$$

$\hat{x}_{uij} = \hat{x}_{ui} - \hat{x}_{uj}$

With these general principles in mind, we can turn to the example shown in FIG. 8 to apply the approach in the seasonality model 800. As shown, the inputs to the model 800 can be the final item seasonality embeddings 818, the final user seasonality embeddings 814, item embeddings 804 and user embeddings 810. The seasonality model 800 differs from existing recommender models in that seasonality model 800 includes the final item seasonality embeddings 818 and the final user seasonality embeddings 814 in addition to non-seasonal data, item embeddings 804 and user embeddings 810. In existing recommender models, the item embeddings and the user embeddings (in addition to user item interaction data) are often the only inputs used to determine recommendations.

Matrix factorization can be used train and then determine the final user-item scores 820. In this example, the product of the item weight matrix 2 816 and the final item seasonality embeddings 818 is combined with a product of the item weight matrix 1 806 and the item embeddings 804. This combination 830 can be designated the H matrix as shown in the further detail below. The product of the user weight matrix 2 and the final user seasonality embeddings 814 can be combined with the product of the user weight matrix 1 808 and the user embeddings 810. This combination 832 can be designated as the W matrix in the further detail below. The dot product of the combination 832 (W matrix) with the combination 830 (H matrix) can be used to determine the final user-item scores 820. Further detail of the application of Bayesian Personalized Ranking (BPR) and matrix factorization as shown in FIG. 8 is detailed below, where $\mathbb{R}$ denotes that the entries in the matrices are real numbers.

$$\text{Item Weight Matrix } 1 = I_{W1} \in \mathbb{R}^{n \times k}$$

$$\text{Item Weight Matrix } 2 = I_{W2} \in \mathbb{R}^{m \times k}$$

$$\text{User Weight Matrix } 1 = U_{W1} \in \mathbb{R}^{n \times k}$$

$$\text{User Weight Matrix } 2 = U_{W2} \in \mathbb{R}^{m \times k}$$

$$\text{User Embedding} = U \in \mathbb{R}^{|U| \times n}$$

$$\text{User Seasonality Embedding} = U_s \in \mathbb{R}^{|U| \times m}$$

$$\text{Item Embedding} = I \in \mathbb{R}^{|I| \times n}$$

$$\text{Item Seasonality Embedding} = I_s \in \mathbb{R}^{|I| \times m}$$

$$W = (U_S U_{W2}, U U_{W1}) \in \mathbb{R}^{|U| \times 2k}$$

$$H = (I_s I_{W2}, I I_{W1}) \in \mathbb{R}^{|I| \times 2k}$$

$$\hat{X} := W H^t$$

$$\hat{x}_{ui} = \langle w_u | h_i \rangle = \sum_{f=1}^{2k} w_{uf} \cdot h_{if}$$

The item and user weight matrices can be randomly initialized as part of the training procedure for the machine learning model. The entries in the weight matrices can be adjusted as the training of the model progresses. Once the training of the model is complete, the weight matrices can become well-defined and can be used along with the non-seasonal user and item embedding matrices and the user and item seasonality embedding matrices to arrive at the final user-item scores by computation of the dot-product.

After training and implementing the seasonality model 800, the recommender systems of the present disclosure can provide final user-item scores that can provide a scalar number(s) for each dimension of seasonality for each user-item. In this manner, seasonal items can be ranked and recommended to the user using the recommender systems of the present disclosure. For example, the final user-item scores can be ranked according to the final user-item scores. A predetermined number of the highest ranked items can then be displayed to the user on the ecommerce website.

Figure 9:
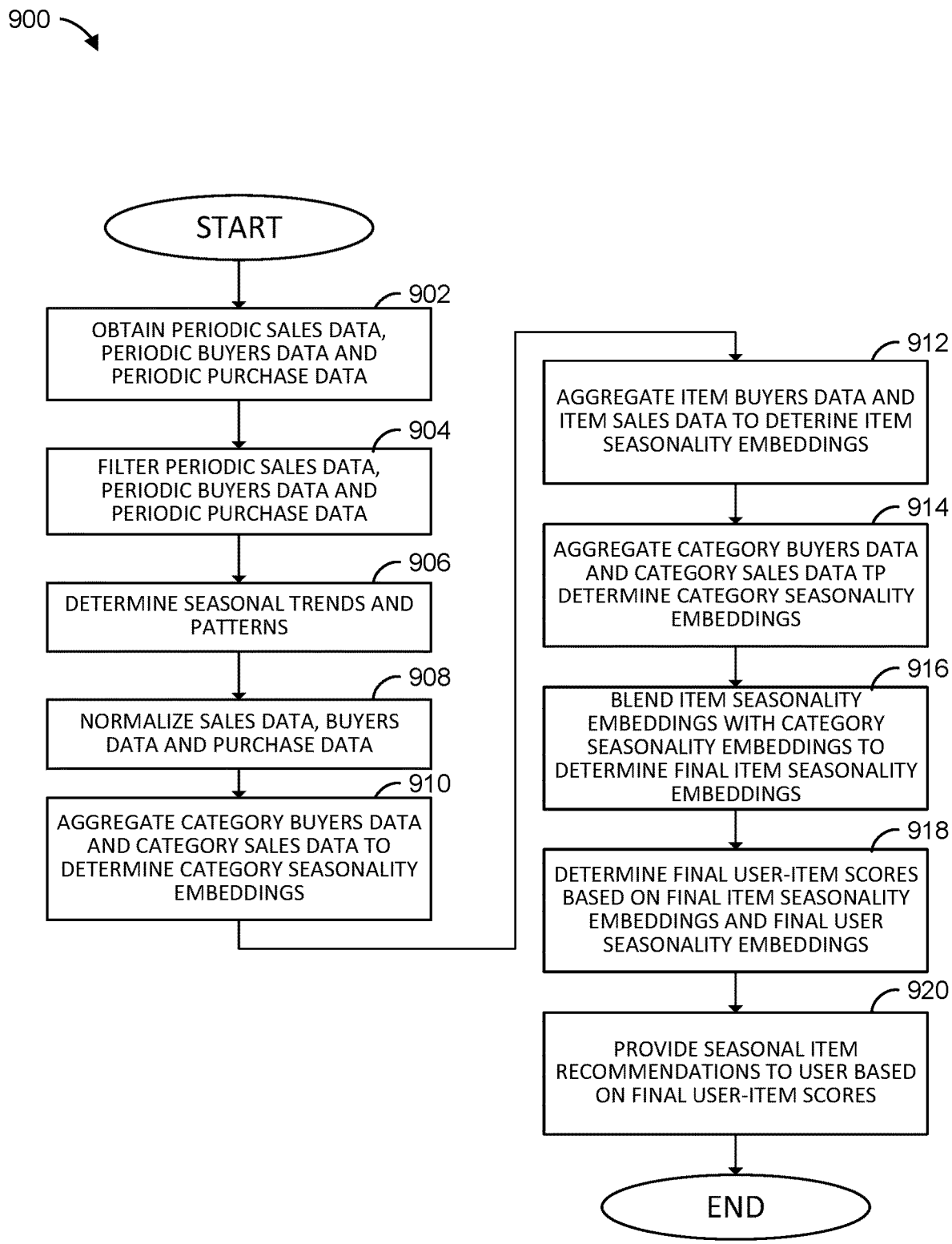
FIG. 9 is a flow chart illustrating an example method of recommending a seasonal item to a user in accordance with the present disclosure.

Referring now to FIG. 9, a method of recommending season items in an ecommerce marketplace is shown. For discussion purposes only, the method is described in the context of the seasonal recommender system 400 previously described. It should be appreciated, however, that the method 900 is not limited to the example recommender system 400 shown in FIG. 4. Other systems and implementations can be used to perform the operations described below.

Method 900 begins at step 902 in which data extraction engine 402 can obtain periodic sales data, periodic buyers data and periodic purchase data. The data extraction engine can obtain the sales data, the buyers data and the purchase data using any suitable method. In one example, the data extraction engine 402 can obtain the data from the database 108 and/or the data source 410 such as through an application protocol interface (API) or other suitable communication technique. The periodic sales data can characterize a number of purchases made of each item available in a catalog of items available on an ecommerce marketplace. The periodic sales data can be obtained for any specified period of time such as for one day such that the periodic sales data is daily sales data. In other examples, other periods can be used. The periodic buyers data can characterize a number of unique customers for each item on the ecommerce marketplace in the same specified period. In the example above where the period is one day, the periodic buyers data can be daily buyers data. The periodic purchase data can characterize a count of purchases for each user in the same specified period. In the example above, the periodic purchase data can be daily purchase data.

At step 904, the data extraction engine 402 can filter the periodic sales data, the periodic buyers data and the periodic purchase data. Any suitable filtering can be performed at step 904. In one example, the data is filtered to retain data for a period of time proximate to the current time. For example, the data can be filtered to retain data for the most recent two years. In other examples, other filtering can be performed such as retaining data for other periods of time such as for the last one year, for the last three years, for the last five years or for other periods of time. In still other examples, filtering can be performed to retain data for only groups, or characteristics that may be of interest. For example, filtering can be performed for certain geographic regions, for certain characteristics of purchases (e.g., in store pick-up, delivery, etc.) or for other characteristics.

At step 906, the sales data, the buyers data and the purchase data can be used to identify seasonal trends and patterns in the data. Any suitable techniques can be used to identify the seasonal trends and patterns in the data. In one example, a seasonality model can be used to identify seasonality trends and patterns. Such a model, for example, can use peak finding algorithms that can be included in open source or other available application, tools and libraries know to those of ordinary skill in the art. While not shown in FIG. 9, various characteristics of the identified seasonality trends and patterns can be stored such as local and global peaks include the magnitude and time frame associated with each identified peak.

At step 908, the sales data, the buyers data and the purchase data can be normalized by the seasonality engine 404. Any suitable techniques, as previously described, can be used to standardize and/or normalize the sales data, the buyers data the purchase data. In one example, a normalization tool such as standard-scalar normalization can be used to normalize the data. Such techniques can be assisted by using open source or other available normalization applications, tools and libraries known to those of ordinary skill in the art. In other examples, other normalization techniques can be used.

At step 910, the category buyers data and the category sales data that has been processed by the seasonality engine 404 can be aggregated to determine category seasonality embeddings. The category seasonality embeddings can be aggregated by the scoring engine 406.

At step 912, the item buyers data and the item sales data can be aggregated to determine the item seasonality embeddings. The item seasonality embeddings can be aggregated by the scoring engine 406.

At step 914, the scoring engine 406 can blend the item seasonality embeddings with the category seasonality embeddings to obtain final item seasonality embeddings. The item seasonality embeddings and the category seasonality embeddings can be blended using any suitable technique. In the example described above, the item seasonality embeddings with the category seasonality embeddings can be blended using a blend function that can weigh the item seasonality embeddings and/or the category seasonality embeddings. The embeddings for example, can be blended using the blend function of Equation 1 described above. In other examples, other blend functions can be used.

At step 916 the seasonality model 408 can determine final user-item scores based on the final item seasonality embeddings and on final user seasonality embeddings. The seasonality model 408 can determine the final user-item scores using a trained machine learning model such as a Bayesian Personalized Ranking model. In other examples, other models or tools can be used.

At step 918, the seasonal recommender systems of the present disclosure can provide recommendations for seasonal items to users based on the final user-items scores. For example, the recommender systems can rank items based on final user-item scores and present a predetermined number of the items with the highest rankings to the user. Such recommendations can be presented to the user via a website, application or other user interface.

The apparatuses and methods of the present disclosure describe recommender systems with advantages over existing recommender systems. First, the recommender systems of the present disclosure are able to identify seasonal trends and patterns and then to identify seasonal items that may be of interest to a user given such identified seasonal trends. The seasonal recommender systems of the present disclosure can identify such seasonal items even though such items may not have significant amounts of transactional data as other items without seasonal purchasing characteristics. In light of this, the seasonal recommender systems of the present disclosure also can assist in boosting cold start items and to present such newly available items as recommended items to the user. This adaptability can result in increased sales, improved click-through rates and increased customer satisfaction.

Furthermore, the final user-item scores and associated data that is determined by the seasonal recommender systems of the present disclosure can have applicability to other functions for a retailer that may be operating an ecommerce marketplace. The information can be used, for example, to forecast sales and to proactively implement purchasing and/or logistics operations that can support seasonal trends that may otherwise go unnoticed and can result in shortages or delays.

The foregoing examples focused on descriptions of the principles and teachings of the present disclosure used in the context of a retailer and an ecommerce marketplace. As can be appreciated, the methods and apparatuses described herein can be applied in various contexts and in various industries. The method and apparatuses of the present disclosure can identify seasonality that may exist in other industries and environments such as in the financial services, health services and other industries as well.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising a computing device comprising at least one processor, the computing device coupled to at least one database, the computing device configured to:
   obtain periodic sales data from the at least one database characterizing a number of purchases made of each item of a plurality of items in a specified period;
   obtain periodic buyers data from the at least one database characterizing a number of unique customers of each item in the plurality of items in the specified period;

obtain periodic purchase data from the at least one database characterizing a count of purchases by each user in the specified period;

determine, using the at least one processor, an item embedding for each item in the plurality of items based on the periodic sales data and the periodic buyers data;

determine, using the at least one processor, an item seasonality embedding based on the periodic sales data and the periodic buyers data;

determine, using the at least one processor, a category seasonality embedding based on the periodic sales data and the periodic buyers data;

blend, using the at least one processor, the item seasonality embedding and the category seasonality embedding using a blending function that weighs the category seasonality embedding based on a number of items in a category to obtain a final item seasonality embedding for each item in the plurality of items;

determine, using the at least one processor, a user embedding for each user based on the periodic purchase data;

determine, using the at least one processor, a final user seasonality embedding for each user based on the periodic purchase data;

generate, using the at least one processor, final user-item scores by applying, for each item in the plurality of items and for each user, a trained machine learning model to a respective item embedding, a respective final item seasonality embedding, a respective user embedding, and a respective final user seasonality embedding, wherein the trained machine learning model is applied by:

generating an item matrix based on the respective item embedding and the respective final item seasonality embedding, generating a user matrix based on the respective user embedding and the respective final user seasonality embedding, computing a dot product of corresponding item and user vectors from the item matrix and the user matrix, respectively, to generate a final user-item score, wherein the trained machine learning model is trained using the at least one processor based on Bayesian Personalized Ranking and matrix factorization using item pairs and a criterion/loss function; and send, using the at least one processor, a recommendation to a user based on the final user-item scores.

2. The system of claim 1, wherein the item embedding is a non-seasonal item embedding and the user embedding is a non-seasonal user embedding.

3. A method comprising:

obtaining periodic sales data from at least one database characterizing a number of purchases made of each item of a plurality of items in a specified period;

obtaining periodic buyers data from at least one database characterizing a number of unique customers of each item in the plurality of items in the specified period;

obtaining periodic purchase data from at least one database characterizing a count of purchases by each user in the specified period;

determining, using at least one processor, an item embedding for each item in the plurality of items based on the periodic sales data and the periodic buyers data;

determining, using the at least one processor, an item seasonality embedding based on the periodic sales data and the periodic buyers data;

determining, using the at least one processor, a category seasonality embedding based on the periodic sales data and the periodic buyers data;

blending, using the at least one processor, the item seasonality embedding and the category seasonality embedding using a blending function that weighs the category seasonality embedding based on a number of items in a category to obtain a final item seasonality embedding for each item in the plurality of items;

determining, using the at least one processor, a user embedding for each user based on the periodic purchase data;

determining, using the at least one processor, a final user seasonality embedding for each user based on the periodic purchase data;

generating, using the at least one processor, final user-item scores by applying, for each item in the plurality of items and for each user, a trained machine learning model to a respective item embedding, a respective final item seasonality embedding, a respective user embedding, and a respective final user seasonality embedding, wherein the trained machine learning model is applied by:

generating an item matrix based on the respective item embedding and the respective final item seasonality embedding, generating a user matrix based on the respective user embedding and the respective final user seasonality embedding, computing a dot product of corresponding item and user vectors from the item matrix and the user matrix, respectively, to generate a final user-item score, wherein the trained machine learning model is trained using the at least one processor based on Bayesian Personalized Ranking and matrix factorization using item pairs and a criterion/loss function; and sending, using the at least one processor, a recommendation to a user based on the final user-item scores.

4. The method of claim 3, wherein the item embedding is a non-seasonal item embedding and the user embedding is a non-seasonal user embedding.

5. A non-transitory computer readable medium having instructions stored thereon, wherein the instructions, when executed by at least one processor, cause a device to perform operations comprising:

obtaining periodic sales data from at least one database characterizing a number of purchases made of each item of a plurality of items in a specified period;

obtaining periodic buyers data from at least one database characterizing a number of unique customers of each item in the plurality of items in the specified period;

obtaining periodic purchase data from at least one database characterizing a count of purchases by each user in the specified period;

determining, using at least one processor, an item embedding for each item in the plurality of items based on the periodic sales data and the periodic buyers data;

determining, using the at least one processor, an item seasonality embedding based on the periodic sales data and the periodic buyers data;

determining, using the at least one processor, a category seasonality embedding based on the periodic sales data and the periodic buyers data;

blending, using the at least one processor, the item seasonality embedding and the category seasonality embedding using a blending function that weighs the category seasonality embedding based on a number of items in a category to obtain a final item seasonality embedding for each item in the plurality of items;

determining, using the at least one processor, a user embedding for each user based on the periodic purchase data;

determining, using the at least one processor, a final user seasonality embedding for each user based on the periodic purchase data;

generating, using the at least one processor, final user-item scores by applying, for each item in the plurality of items and for each user, a trained machine learning model to a respective item embedding, a respective final item seasonality embedding, a respective user embedding, and a respective final user seasonality embedding, wherein the trained machine learning model is applied by:

generating an item matrix based on the respective item embedding and the respective final item seasonality embedding, generating a user matrix based on the respective user embedding and the respective final user seasonality embedding, computing a dot product of corresponding item and user vectors from the item matrix and the user matrix, respectively, to generate a final user-item score, wherein the trained machine learning model is trained using the at least one processor based on Bayesian Personalized Ranking and matrix factorization using item pairs and a criterion/loss function; and sending, using the at least one processor, a recommendation to a user based on the final user-item scores.

* * * * *